United States Patent
Kinoshita et al.

(10) Patent No.: US 9,193,337 B2
(45) Date of Patent: Nov. 24, 2015

(54) BRAKE HYDRAULIC PRESSURE CONTROL SYSTEM FOR VEHICLE

(71) Applicants: NISSIN KOGYO CO., LTD., Ueda-Shi, Nagano (JP); HONDA MOTOR CO., LTD., Minato-Ku, Tokyo (JP)

(72) Inventors: Takashi Kinoshita, Ueda (JP); Kohei Akamine, Saitama (JP); Yuzo Okubo, Saitama (JP)

(73) Assignees: Nissin Kogyo Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 14/139,962

(22) Filed: Dec. 24, 2013

(65) Prior Publication Data

US 2014/0183936 A1    Jul. 3, 2014

(30) Foreign Application Priority Data

Dec. 27, 2012  (JP) ................ 2012-284967

(51) Int. Cl.
  *B60T 8/172*  (2006.01)
  *B60T 13/74*  (2006.01)
  *B60T 7/12*   (2006.01)
  *B60T 7/04*   (2006.01)
  *B60T 8/40*   (2006.01)

(52) U.S. Cl.
  CPC ............... *B60T 8/172* (2013.01); *B60T 7/042* (2013.01); *B60T 7/122* (2013.01); *B60T 13/745* (2013.01); *B60T 8/4081* (2013.01); *B60T 2201/06* (2013.01)

(58) Field of Classification Search
  CPC .... B60T 13/745; B60T 8/172; B60T 2201/06
  See application file for complete search history.

(56) References Cited

U.S. PATENT DOCUMENTS

2003/0160503 A1 * 8/2003 Riddiford et al. ............... 303/3
2008/0300763 A1 * 12/2008 Mori et al. ..................... 701/70

(Continued)

FOREIGN PATENT DOCUMENTS

| JP | 2005-088787 A | 4/2005 |
| JP | 2009166564    | 7/2009 |
| JP | 2009190485    | 8/2009 |

OTHER PUBLICATIONS

Extended European Search Report dispatched on Mar. 27, 2014, issued over the counterpart EP Patent Application EP 13 19 8853.7.

(Continued)

*Primary Examiner* — Bradley King
(74) *Attorney, Agent, or Firm* — Carrier Blackman & Associates, P.C.; Joseph P. Carrier; Anne G. Sabourin

(57) ABSTRACT

Brake hydraulic pressure is appropriately prevented from becoming lower than a reference brake pressure for holding control. When a physical amount correlating with the rotational speed of an electric motor has become higher than or equal to a predetermined value, an HSA start reference pressure setting unit sets an HSA start reference pressure to a value higher than a reference brake pressure, and if the HSA start reference pressure at a time when a driver required fluid pressure has become lower than the HSA start reference pressure is higher than the reference brake pressure, an HSA required fluid pressure setting unit sets an HSA required fluid pressure at a time when the driver required fluid pressure has become lower than the HSA start reference pressure to a value higher than the reference brake pressure.

5 Claims, 7 Drawing Sheets

(56) References Cited

U.S. PATENT DOCUMENTS

2010/0256885 A1\* 10/2010 Logan et al. .................. 701/70
2011/0073419 A1   3/2011 Matsuzaki et al.

OTHER PUBLICATIONS

Notice of Reasons for Rejection of Oct. 21, 2014 issued in the counterpart Japanese patent application JP 2012-284967.

\* cited by examiner

HSA START REFERENCE PRESSURE (HSA REQUIRED FLUID PRESSURE)

BRAKE HYDRAULIC PRESSURE CONTROL SYSTEM FOR VEHICLE

CROSS REFERENCE TO RELATED APPLICATION

This application claims the priority of Japanese Patent Application No. 2012-284967, filed on Dec. 27, 2012, the entire specification, claims and drawings of which are incorporated herewith by reference.

BACKGROUND OF THE INVENTION

1. Field of the Invention

The present invention relates to a brake hydraulic pressure control system for vehicle capable of holding a stop state of the vehicle by controlling the displacement amount of a piston by an electric motor when the vehicle is stopped.

2. Description of the Related Art

For example, Patent Literature 1 (JP 2005-88787 A) discloses a brake hydraulic pressure control system for vehicle that controls the brake hydraulic pressure of the vehicle by controlling an actuator provided with an electric motor. This brake hydraulic pressure control system for vehicle holds a brake hydraulic pressure by maintaining the rotational position of the rotation shaft of the electric motor.

SUMMARY OF THE INVENTION

When hill start assist control is executed using the brake hydraulic pressure control system for vehicle disclosed in the Patent Literature 1, after a driver steps off a brake pedal, it is necessary to reduce the brake hydraulic pressure down to a reference brake pressure that is set high enough to prevent the vehicle from going backward. Accordingly, it is necessary to rotate the electric motor so as to greatly reduce the brake hydraulic pressure and then stop the electric motor when the brake hydraulic pressure has become the reference brake pressure. However, as the electric motor rotates by inertial force even if current flowing in the electric motor is stopped, it may occur that the brake hydraulic pressure temporarily drops below the reference break pressure by the excessive rotation.

The present invention has been developed to address the above-described problem, and an object of the invention is to provide a brake hydraulic pressure control system for vehicle capable of appropriately preventing a brake hydraulic pressure from becoming lower than a reference brake pressure of holding control.

According to the present invention developed in order to solve such a problem, a brake hydraulic pressure control system for vehicle includes: a brake operation element; an operation amount detecting unit for detecting an operation amount of the brake operation element; an electric motor that is driven, based on the operation amount detected by the operation amount detecting unit; a piston that operates forward and backward, accompanying rotation of the electric motor; and a wheel cylinder for braking wheels by a brake hydraulic pressure corresponding to a displacement amount of the forward and backward operation of the piston, wherein the displacement amount of the piston is controlled by the electric motor in order to perform holding control, based on a reference brake pressure that is necessary for maintaining a stop state of the vehicle, and wherein if a physical amount correlating with a rotational speed of the electric motor has become greater than or equal to a predetermine value, a holding control start reference pressure, the holding control start reference pressure serving as a threshold value for starting the holding control, is set higher than the reference brake pressure.

According to the invention, if the physical amount correlating with the rotational speed of the electric motor has become higher than or equal to the predetermined value by an operator's sudden stepping off a brake operation element, the holding control start reference pressure is set higher than the reference brake pressure, and it is thereby possible to appropriately prevent the brake hydraulic pressure from dropping below the reference brake pressure of the holding control.

Further, an offset pressure setting unit for setting an offset pressure to be added to the reference brake pressure may be provided, wherein the offset pressure setting unit sets the offset pressure, corresponding to the physical amount correlating with the rotational speed of the electric motor. By this arrangement, the offset pressure can be set, corresponding to the physical amount correlating with the rotational speed of the electric motor, and it is thereby possible to appropriately set a fluid pressure higher than the reference brake pressure, corresponding to the degree of requirement by the driver.

Still further, the physical amount correlating with the rotational speed of the electric motor may be an amount of change per predetermined time in a driver required fluid pressure that is a brake hydraulic pressure required by a driver. By this arrangement, as the rotational speed of the electric motor is controlled by the driver required fluid pressure, it is possible to perform control corresponding to the rotational speed of the electric motor, instead of directly detecting the rotational speed of the electric motor.

Yet further, arrangement may be such that the larger the amount of change per the predetermined time in the driver required fluid pressure is, the higher value the offset pressure is set to. By this arrangement, the offset pressure can be appropriately set, corresponding to a change per the predetermined time in the driver required fluid pressure.

Further, the brake hydraulic pressure control system may be further provided with: a holding-control start reference pressure setting unit for setting a holding control start reference pressure, the holding control start reference pressure serving as a threshold value for starting the holding control, based on the reference brake pressure necessary for maintaining a stop state of the vehicle; and a holding-control required fluid pressure setting unit for setting a holding control required fluid pressure serving as a target fluid pressure after starting the holding control.

By this arrangement, for example, after the vehicle stops on an ascent road, when the physical amount correlating with the rotational speed of the electric motor (for example, the returning speed of the brake operation element, the amount of change per predetermined time in the driver required fluid pressure, the rotational speed of the electric motor, etc.) has become a value greater than a predetermined value, the holding-control start reference pressure setting unit sets the holding control start reference pressure to a high value. Thus, a holding control starts when the driver required fluid pressure has become lower than the holding control start reference pressure. Further, even if the driver requested fluid pressure has become lower than the holding control start reference pressure in a state that the driver required fluid pressure has suddenly dropped by the driver's sudden stepping off the brake operation element, the holding control is made start at a fluid pressure higher than the reference brake pressure, and it is thereby possible to appropriately prevent the holding pressure from becoming lower than the reference brake pressure.

Still further, the driver required fluid pressure at the time when the driver required fluid pressure has become lower than the holding control start reference pressure may be set such as to have a gradient gradually decreasing down to a value that is equal to the holding control start reference pressure at the above-described time. With such arrangement, the driver required fluid pressure gradually decreases until the driver required fluid pressure becomes a value equal to the holding control start reference value (The brake pressure is gradually decreased.), and it is thereby possible to obtain an appropriate control so that the brake hydraulic pressure controlled by the electric motor does not overshoot below a reference brake pressure.

Yet further, arrangement may be made such that the higher the offset pressure is, the longer the time until the value of the holding control required fluid pressure returns to a value equal to the reference brake pressure becomes. By such arrangement, it is possible to perform control so that the brake hydraulic pressure controlled by the electric motor is ensured to be controlled down to the reference brake pressure without overshooting.

Still further, an inclination detecting unit for detecting an inclination of the vehicle with respect to a front/rear direction may be provided, wherein the reference brake pressure is set, based on an inclination amount detected by the inclination detecting unit. By this arrangement, it is possible to change the reference brake pressure, based on the inclination detecting unit, and appropriate application to hill-start assist control is attained.

According to the present invention, it is possible to obtain a brake hydraulic pressure control system for vehicle capable of appropriately preventing a brake hydraulic pressure from becoming lower than a reference brake pressure of holding control.

PREFERRED EMBODIMENT OF THE INVENTION

Figure 1:
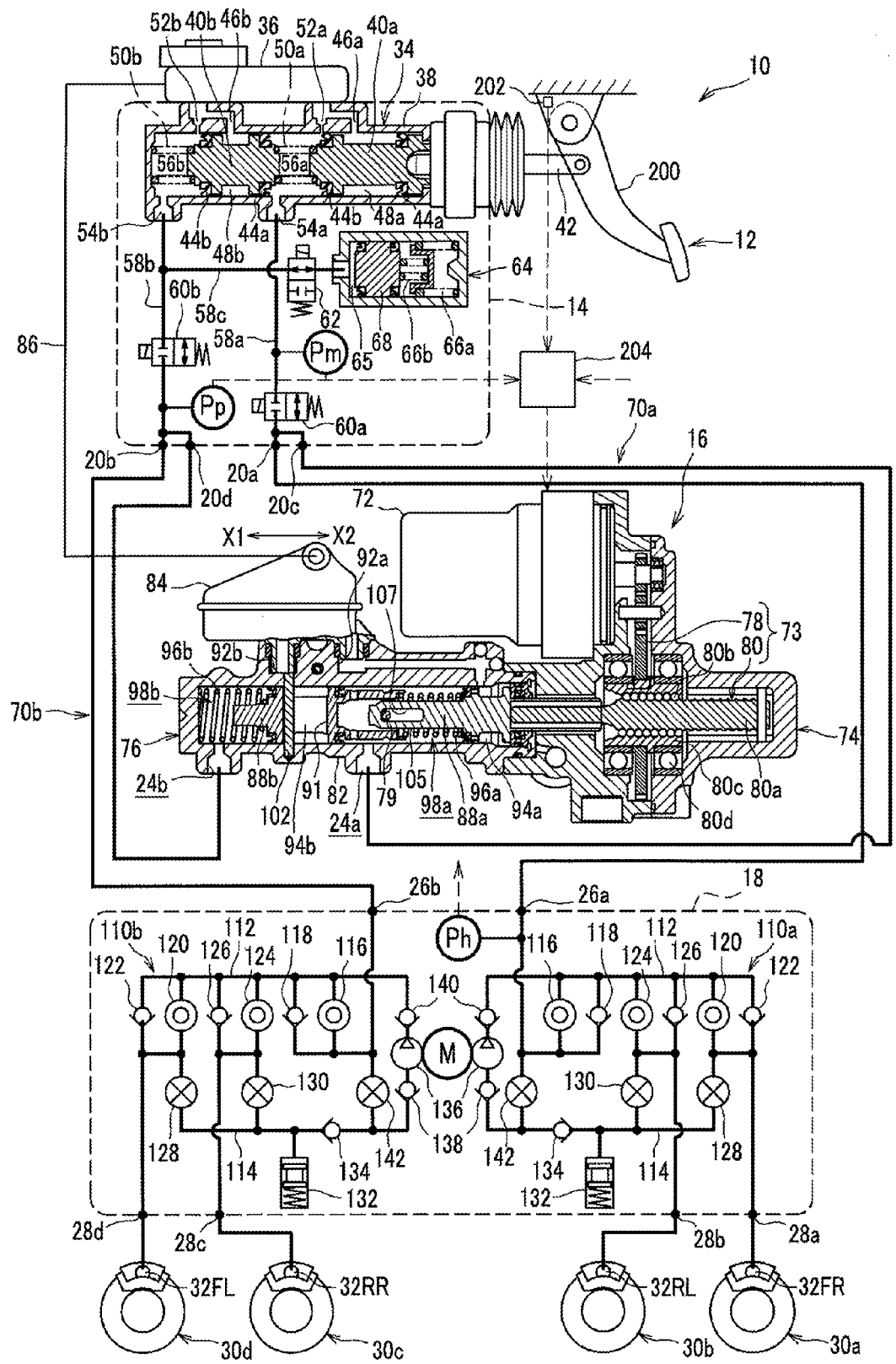
FIG. 1 is a schematic configuration diagram of a brake hydraulic pressure control system for vehicle according to the present invention.

In the following, an embodiment of the present invention will be described in detail, referring to the drawings, as appropriate.

FIG. 1 is a schematic configuration diagram of a brake hydraulic pressure control system for vehicle according to the present invention.

A brake hydraulic pressure control system for vehicle 10 shown in FIG. 1 includes both a brake system of a by-wire type for normal use, which operates a brake by transmitting an electrical signal, and a conventional hydraulic brake system for failsafe use, which operates a brake by transferring a hydraulic pressure.

Accordingly, basically, as shown in FIG. 1, the brake hydraulic pressure control system for vehicle 10 is basically provided with an input device 14 for input of operation when a brake pedal (brake operation element) 12 is manipulated or operated by a driver, a motor cylinder device 16 for controlling the brake hydraulic pressure, and a vehicle stability assist device 18 (hereinafter referred to as a VSA device 18, VSA: registered trade mark) for assisting the stabilization of vehicle behavior, wherein these devices are separately arranged.

Further, the brake pedal 12 for the input device 14 is provided with a stroke sensor (an operation amount detecting unit) 202. The stroke sensor 202 detects the pedal stroke (operation amount) of a pedal part 200, which rotationally moves by pedaling operation by the driver, periodically with predetermined temporal intervals Δt. A detection signal of the pedal stroke detected by the stroke sensor 202 is output to a controller 204. The controller 204 will be described later in detail.

These devices, namely, the input device 14, the motor cylinder device 16, and the VSA device 18 are connected by hydraulic passages formed by a tube material, for example, a hose or a tube. Further, as a by-wire brake system, the input device 14 and the motor cylinder device 16 are electrically connected by a harness, not shown.

Regarding the hydraulic passages, a connection port 20a of the input device 14 and an inlet port 26a of the VSA device 18 are connected by a piping tube. Another connection port 20b of the input device 14 and another inlet port 26b of the VSA device 18 are connected by a piping tube.

Further, a branch port 20c communicating with the connection port 20a of the input device 14 and an output port 24a of the motor cylinder device 16 are connected by a piping tube. Still further, a branch port 20d communicating with the other connection port 20b of the input device input device 14 and another output port 24b of the motor cylinder device 16 are connected by a piping tube. Incidentally, in FIG. 1, the output ports 24a, 24b of the motor cylinder device 16 are shown on the lower portion side for convenience, differently from actual positions.

The VSA device 18 is provided with plural outlet ports 28a-28d. The first outlet port 28a is connected by a piping tube with the wheel cylinder 32FR of a disc brake mechanism 30a provided at the right front wheel.
The second outlet port 28b is connected by piping tube with the wheel cylinder 32RL of a disc brake mechanism 30b provided at the left rear wheel.
The third outlet port 28c is connected by a piping tube with the wheel cylinder 32RR of a disc brake mechanism 30c provided at the right rear wheel. The fourth outlet port 28d is connected by a piping tube with the wheel cylinder 32FL of a disc brake mechanism 30d provided at the left front wheel.

In this case, brake fluid is supplied through the piping tubes connected with the respective outlet ports 28a-28d to the respective wheel cylinders 32FR, 32RL, 32RR, and 32FL of the disc brake mechanisms 30a-30d. A rise in the fluid pressure in the wheel cylinder 32FR, 32RL, 32RR, or 32FL operates the wheel cylinder 32FR, 32RL, 32RR, or 32FL, and a braking force is applied to the corresponding wheel (the right front wheel, the left rear wheel, the right rear wheel, or the left front wheel).

The brake hydraulic pressure control system for vehicle 10 is arranged to be mountable on various vehicles including, for example, a vehicle driven only by an engine (internal combustion engine), a hybrid vehicle, an electric vehicle, and a fuel cell vehicle.

The input device 14 includes a tandem master cylinder 34 capable of generating a brake hydraulic pressure by a driver's pedaling operation of the brake pedal 12 and a first reservoir 36 provided at the master cylinder 34.

Inside a cylinder tube 38 of the master cylinder 34, two pistons 40a and 40b are slidably arranged, wherein the two pistons 40a and 40b are separated from each other with a certain distance along the axial direction of the cylinder tube 38. The one piston 40a is disposed adjacent to the brake pedal 12 and is connected with the brake pedal 12 through a push rod 42 and is directly moved. The other piston 40b is disposed with a longer distance than the piston 40a from the brake pedal 12.

A pair of cup seals 44a and 44b is attached to the each of the outer circumferential surfaces of the one and the other pistons 40a and 40b through an annular stepped portion. Back chambers 48a and 48b communicating with later-described supply ports 46a and 46b are formed between the pairs of cup seals 44a and 44b. Further, a spring member 50a is arranged between the one and the other pistons 40a and 40b. Another spring member 50b is arranged between the other piston 40b and the side end portion of the cylinder tube 38. Incidentally, each of the pair of cup seals 44a and 44b may be attached to the inner wall of the cylinder tube 38 through an annular groove.

The cylinder tube 38 of the master cylinder 34 is provided with two supply ports 46a and 46b, two relief ports 52a and 52b, and two output ports 54a and 54b. In this case, the supply ports 46a (46b), and the relief ports 52a (52b), are arranged to join with each other and communicate with a reservoir chamber, not shown, in the first reservoir 36.

Further, inside the cylinder tube 38 of the master cylinder 34, a first pressure chamber 56a and a second pressure chamber 56b are provided to generate a brake hydraulic pressure according to a braking effort applied by the driver to the brake pedal 12. The first pressure chamber 56b is arranged such as to communicate with the connection port 20b through a first hydraulic passage 58b. The second pressure chamber 56a is arranged such as to communicate with the connection port 20a through a second hydraulic passage 58a.

Between the master cylinder 34 and the connection port 20b, a first shut-off valve 60b of a solenoid valve of a normal open type is arranged on the upstream side with respect to the first hydraulic passage 58b, and a pressure sensor Pp is arranged on the downstream side with respect to the first hydraulic passage 58b. On the first hydraulic passage 58b, this pressure sensor Pp detects the hydraulic pressure on the downstream side of the first shut-off valve 60b, in other words, on the side of the wheel cylinders 32FR, 32RL, 32RR, and 32FL. That is, the fluid pressure controlled by the motor cylinder device 16 is detected by the pressure sensor Pp, and a detection signal corresponding to the controlled fluid pressure is output from the pressure sensor Pp to the controller 204.

A pressure sensor Pm is arranged between the master cylinder 34 and the connection port 20a and on the upstream side with respect to the second hydraulic passage 58a. A second shut-off valve 60a, which is a normal open type solenoid valve, is provided on the downstream side with respect to the second hydraulic passage 58a. The pressure sensor Pm detects the fluid pressure on the upstream side of the second shut-off valve 60a, in other words, on the master cylinder 34 side, on the second hydraulic passage 58a. The detection signal corresponding to the fluid pressure on the master cylinder 34 side, the fluid pressure having been detected by the pressure sensor Pm, is output to the controller 204.

A normal open type valve regarding the first shut-off valve 60b or the second shut-off valve 60a refers to a valve configured such that the normal position (the position of the valve body when current is not applied) is in a state of being at an open position (normally open). Incidentally, in FIG. 1, the first shut-off valve 60b and the second shut-off valve 60a are shown in a state that a current is applied to solenoids and the valve bodies, not shown, operate, the state being a valve closed state.

A branch hydraulic passage 58c branching from the first hydraulic passage 58b is provided between the master cylinder 34 and the first shut-off valve 60b on the first hydraulic passage 58b, wherein a third shut-off valve 62, which is a solenoid valve of a normal closed type, and a stroke simulator 64 are serially connected on the branch hydraulic passage 58c.

A normal close type valve regarding the third shut-off valve 62 refers to a valve configured such that the normal position (the position of the valve body when current is not applied) is in a state of being at a close position (normally closed). Incidentally, in FIG. 1, the third shut-off valve 62 is shown in a state that a current is applied to a solenoid and the valve body, not shown, operates, the state being a valve open state.

The stroke simulator 64 is a device that, in by-wire control, generates a reaction force corresponding to the stroke of the brake, and thereby makes a driver feel as if the driver generated a braking force by a braking effort by the driver. The stroke simulator 64 is disposed on the master cylinder 34 side of the first shut-off valve 60b on the first hydraulic passage 58b.

The stroke simulator 64 is provided with a hydraulic pressure chamber 65 communicating with the branched hydraulic passage 58c, and is arranged such as to be able to suck brake fluid that is led out through the hydraulic pressure chamber 65 from the first pressure chamber 56b of the master cylinder 34.

Further, the stroke simulator 64 includes a first return spring 66a with a larger spring constant, a second return spring 66b with a smaller spring constant, the first and the second springs 66a and 66b being serially disposed with each other, and a simulator piston 68 urged by the first and second return springs 66a and 66b. The stroke simulator 64 is arranged such that the pedal feeling of the brake pedal 12 becomes equivalent to an existing master cylinder.

The configuration of the hydraulic passages is roughly categorized into a first hydraulic system 70b that connects the first pressure chamber 56b of the master cylinder 34 and the plurality of wheel cylinders 32RR and 32FL, and a second hydraulic system 70a that connects the second pressure chamber 56a of the master cylinder 34 and the plurality of wheel cylinders 32FR and 32RL.

The first hydraulic system 70b is configured by the first hydraulic passage 58b connecting the output port 54b of the master cylinder 34 (cylinder tube 38) of the input device 14 and the connection port 20b, a piping tube that connects the connection port 20b of the input device 14 and the inlet port 26b of the VSA device 18, a piping tube that connects the branch port 20d of the input device 14 and the output port 24b of the motor cylinder device 16, and piping tubes that connect the outlet ports 28c and 28d of the VSA device 18 and the respective wheel cylinders 32RR and 32FL.

The second hydraulic system 70a is configured by the second hydraulic passage 58a connecting the output port 54a of the master cylinder 34 (cylinder tube 38) of the input device 14 and the connection port 20a, a piping tube that connects the connection port 20a of the input device 14 and the inlet port 26a of the VSA device 18, a piping tube that connects the branch port 20c of the input device 14 and the output port 24a of the motor cylinder device 16, and piping tubes that connects the outlet ports 28a and 28b of the VSA device 18 and the respective wheel cylinders 32FR and 32RL.

As a result, by forming the hydraulic passages by the first hydraulic system 70b and second hydraulic system 70a, the respective wheel cylinders 32RR and 32FL, and the respective wheel cylinders 32FR and 32RL, can be independently operated so that braking forces which are independent from each other can be generated.

The motor cylinder device 16 includes an actuator mechanism 74 having an electric motor (electric driving unit) 72 and a driving force transmission section 73, and a cylinder mechanism 76 urged by the actuator mechanism 74. In this case, the electric motor 72, the driving force transmission section 73, and the cylinder mechanism 76 are arranged to be separable from each other.

Further, the driving force transmission section 73 of the actuator mechanism 74 includes a gear mechanism (decelerating mechanism) 78 for transmitting the rotational driving force of the electric motor 72, and a ball screw assembly (conversion mechanism) 80 that converts this rotational driving force into linear movement (axial force along a linear direction) and transmits the linear movement to first and second slave pistons 88a and 88b side of the cylinder mechanism 76.

The electric motor 72 is subjected to drive control based on a control signal (electrical signal) from the controller 204, and is for example a servo motor, wherein the electric motor 72 is disposed higher than the actuator mechanism 74. By such a disposition arrangement, oil component such as grease in the driving force transmission section 73 is satisfactorily prevented from entering the electric motor 72 by gravity action. The electric motor 72 is driven, based on a pedal stroke detected by the stroke sensor 202.

The ball screw assembly 80 includes a ball screw shaft (rod) 80a whose one end side contacts with the second slave piston 88a of the cylinder mechanism 76, plural balls 80b that roll and move along a screw groove in a spiral shape formed on the outer circumferential surface of the ball screw shaft 80a, a nut member 80c substantially in a cylindrical shape that is fitted to the inside of the ring gear of a gear mechanism 78 to rotate integrally with the ring gear and is screw-engaged with the balls 80b, and a pair of ball bearings 80d for rotatably and axially supporting the one end side and the other end side of the nut member 80c with respect to the axial direction. Incidentally, the nut member 80c is fixed to the inner diameter surface of the ring gear of the gear mechanism 78, for example, by pressure fitting.

The driving force transmission section 73 is configured in such a manner. Thus, after the rotational driving force of the electric motor 72 transmitted through the gear mechanism 78 is input to the nut portion 80c, the rotational driving force is converted into a linear axial force (linear movement) by the ball screw assembly 80 to move the ball screw shaft 80a forward and backward along the axial direction.

The motor cylinder device 16 transmits the driving force of the electric motor 72 to the first slave piston 88b and the second slave piston 88a of the cylinder mechanism 76 through the driving force transmission section 73, drives thereby the first slave piston 88b and the second slave piston 88a so as to generate a brake hydraulic pressure. That is, the motor cylinder device 16 includes the electric motor 72, which is driven, based on the pedal stroke, and pistons (first slave piston 88b and the second slave piston 88a), which move forward and backward, accompanying the rotation of the electric motor 72. Incidentally, the following description will be made on assumption that displacements, along the arrow direction X1 (see FIG. 1), of the first slave piston 88b and the second slave piston 88a are 'forward displacement', and displacements along the arrow direction X2 (see FIG. 1) are 'backward displacement'. Further, arrow X1 may represent 'forward', and arrow X2 may represent 'backward'.

The cylinder mechanism 76 is configured as a tandem cylinder mechanism that includes a cylinder main body 82 in a cylindrical shape with a bottom portion and a second reservoir 84 provided on the cylinder main body 82, wherein the two pistons (the first slave piston 88b and the second slave piston 88a) are serially disposed in the cylinder main body 82.

The second reservoir 84 is connected by a piping tube 86 with the first reservoir 36 arranged on the master cylinder 34 of the input device 14, and is arranged so that the brake fluid reserved in the first reservoir 36 is supplied into the second reservoir 84 through the piping tube 86.

Further, the cylinder mechanism 76 is provided with a first piston mechanism that is configured with an integrated assembly of peripheral components including the first slave piston 88b, and a second piston mechanism configured with an integrated assembly of peripheral components including the second slave piston 88a. The first piston mechanism and the second piston mechanism are integrally assembled such as to be partially superimposed with each other through a connecting pin 79.

The first piston mechanism includes the first slave piston 88b arranged such as to adjoin a first fluid pressure chamber 98b at the front part of the cylinder main body 82, a stopper pin 102 that is engaged with a penetration hole 91 formed at the middle part of the first slave piston 88b to restrict the movement range of the first slave piston 88b, and a first spring 96b that is arranged between the first slave piston 88b and the side end portion (bottom wall) of the cylinder main body 82 to press the first slave piston 88b backward (in arrow direction X2).

The second piston mechanism includes the second slave piston 88a arranged such as to adjoin a second fluid pressure chamber 98a posterior (in the arrow direction X2) to the first slave piston 88b, and a second spring 96a that is arranged between the first slave piston 88b and the second slave piston 88a to urge the first slave piston 88b and the second slave piston 88a in the directions where these pistons moves farther from each other.

A long hole 107 is formed through an axial portion 105 at the front part of the second slave piston 88a, wherein a connecting pin 79 penetrates through the long hole 107. The long hole 107 is formed such as to extend along the axial direction of the second slave piston 88a and to penetrate through in the direction perpendicular to the axial direction. The connecting pin 79 penetrating thorough the long hole 107 restricts the distance between the first slave piston 88b and the second slave piston 88a separated from each other, and also restricts the initial position of the second slave piston 88a.

Incidentally, the second slave piston 88a is disposed adjacent to the ball screw assembly 80 side, is in contact with one end portion of the ball screw shaft 80a, and is arranged such as to displace in the arrow direction X1 or X2 integrally with the ball screw shaft 80a. The first slave piston 88b is disposed farther than the second slave piston 88a from the ball screw assembly 80 side.

A first back chamber 94b and a second back chamber 94a, which respectively communicate with later-described reservoir ports 92a, 92b, are formed on the outer circumferential surfaces of the first and second slave pistons 88b, 88a.

The cylinder main body 82 of the cylinder mechanism 76 is provided with the two reservoir ports 92a, 92b and the two output ports 24a, 24b. In this case, the reservoir port 92a (92b) is provided, communicating with a reservoir chamber, not shown, in the second reservoir 84.

Further, inside the cylinder main body 82, there are provided a first fluid pressure chamber 98b for controlling the brake hydraulic pressure that is output from the output port 24b to the wheel cylinders 32RR, 32FL side, and a second brake hydraulic pressure chamber 98a for controlling the brake hydraulic pressure that is output from the other output port 24a to the wheel cylinders 32FR, 32RL side.

The first slave piston 88b is provided with the stopper pin 102 that engages with the penetration hole 91 penetrating along the direction substantially perpendicular to the axial direction of the first slave piston 88b, thus restricts the sliding range of the first slave piston 88b, and thereby prevents the first slave piston 88b from over returning to the second slave piston 88a side. By this stopper pin 102, particularly at the time of backup in performing braking with a brake hydraulic pressure generated by the master cylinder 34, defect of the first hydraulic pressure system 70b is prevented when a defect has occurred on the second hydraulic pressure system 70a. Incidentally, the stopper pin 102 is inserted from the opening portion of the reservoir port 92b and is stopped by a stopping hole formed on the cylinder main body 82.

The VSA device 18 includes a first brake system 110b for control of the first hydraulic system 70b connected to the disc brake mechanisms 30c and 30d (wheel cylinders 32RR and 32FL) for the right rear wheel and the left front wheel. Further, the VSA device 18 includes a second brake system 110a for control of the second hydraulic system 70a connected to the disc brake mechanisms 30a and 30b (wheel cylinders 32FR and 32RL) for the right front wheel and the left rear wheel.

Incidentally, the second brake system 110a may be formed by a hydraulic system connected to disc brake mechanisms arranged at the left front wheel and the right front wheel, and the first brake system 110b may be formed by a hydraulic system connected to disc brake mechanisms arranged at the left rear wheel and the right rear wheel. Further, the second brake system 110a may be formed by a hydraulic system connected to disc brake mechanisms arranged at the right front wheel and the right rear wheel on one side of the vehicle body, and the first brake system 110b may be formed by a hydraulic system connected to disc brake mechanisms arranged at the left front wheel and the left rear wheel on the other one side of the vehicle body.

As the first brake system 110b and the second brake system 110a have the same structure, the same reference symbols are assigned to elements corresponding to each other between the first brake system 110b and the second brake system 110a. In the following, the second brake system 110a will be mainly described while describing the first brake system 110b with bracketed notes.

The second brake system 110a (the first brake system 110b) has a first shared hydraulic passage 112 and a second shared hydraulic passage 114 shared by the wheel cylinders 32FR and 32RL (32RR and 32FL).

The VSA device 18 includes a regulator valve 116, which is a normal-open type solenoid valve disposed between the inlet port 26a (inlet port 26b) and the first shared hydraulic passage 112, a first check valve 118 that is arranged in parallel with the regulator valve 116 to allow the brake fluid to flow from the inlet port 26a side (inlet port 26b side) to the first shared hydraulic passage 112 side (while inhibiting the brake fluid from flowing from the first shared hydraulic passage 112 side to the inlet port 26a side), and a first invalve 120, which is a normal open type solenoid valve disposed between the first shared hydraulic passage 112 and the first outlet port 28a (fourth outlet port 28d). Further, the VSA device 18 includes a second check valve 122 that allows the brake fluid to flow from the first outlet port 28a side (fourth outlet port 28d side) to the first shared hydraulic passage 112 side (while inhibiting the brake fluid from flowing from the first shared hydraulic passage 112 side to the first outlet port 28a side), the second check valve 122 being arranged parallel with the first invalve 120, a second invalve 124, which is a normal open type solenoid valve disposed between the first shared hydraulic passage 112 and the second outlet port 28b (third outlet port 28c), and a third check valve 126 that allows the brake fluid to flow from the second outlet port 28b side (third outlet port 28c side) to the first shared hydraulic passage 112 side (while inhibiting the brake fluid from flowing from the first shared hydraulic passage 112 side to the second outlet port 28b side), the third check valve 126 being arranged parallel to the second invalve 124.

Still further, the VSA device 18 includes first outlet valves 128, which are normal closed type solenoid valves disposed between the first outlet port 28a (the fourth outlet port 28d) and the second shared hydraulic passages 114, second outlet valves 130, which are normal closed type solenoid valves disposed between the second outlet port 28b (third outlet port 28c) and the second shared hydraulic passages 114, reservoirs 132 connected to the second shared hydraulic passages 114, fourth check valves 134 that are disposed between the first shared hydraulic passages 112 and the second shared hydraulic passages 114 to allow the brake fluid to flow from the second shared hydraulic passages 114 side to the first shared hydraulic passages 112 side (while inhibiting the brake fluid from flowing from the first shared hydraulic passages 112 side to the second shared hydraulic passages 114 side), pumps 136 that are disposed between the fourth check valves 134 and the first shared hydraulic passages 112 to supply the brake fluid from the second shared hydraulic passages 114 side to the first shared hydraulic passages 112 side, intake valves 138 and discharge valves 140 provided before and after the pumps 136, a motor M for driving the pumps 136, and suction valves 142, which are normal closed type suction valves disposed between the second shared hydraulic passages 114 and the inlet port 26a (the inlet port 26b).

Incidentally, in the second brake system 110a, a pressure sensor Ph is provided on the hydraulic passage adjacent to the inlet port 26a to detect the hydraulic brake hydraulic pressure having been controlled by the first hydraulic pressure chamber 98a of the motor cylinder device 16 and output from the output port 24a of the motor cylinder device 16. Detection signals detected by the respective pressure sensors Pm, Pp, and Ph are introduced to the controller 204. Further, the VSA device 18 performs VSA control, and also performs control including ABS control.

Figure 2:
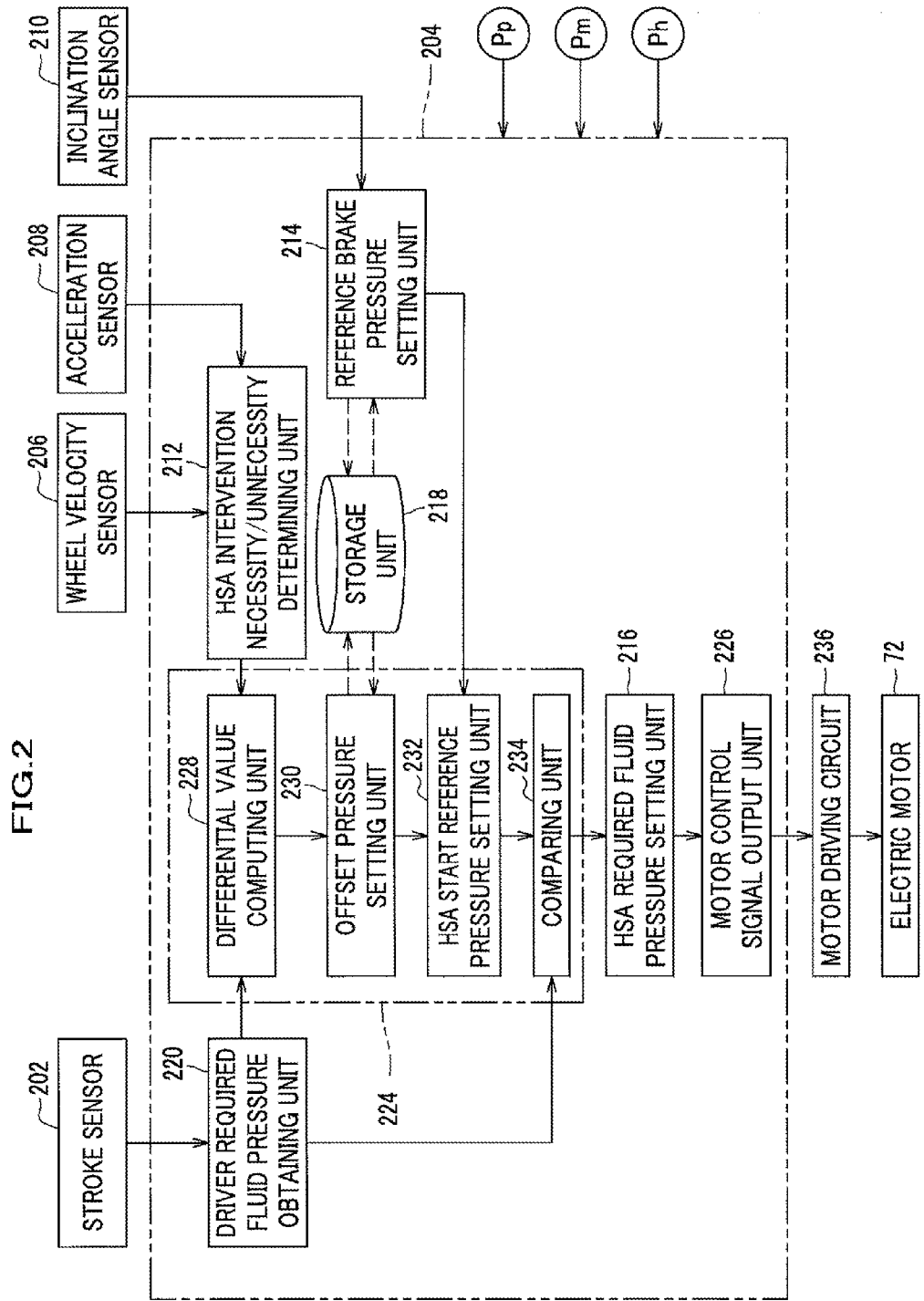
FIG. 2 is a block diagram showing the configuration of a controller.

In the following, the controller 204 will be described. FIG. 2 is a block diagram showing the configuration of a controller As shown in FIG. 2, in addition to the stroke sensor (operation amount detecting unit) 202 for detecting pedal stroke of the pedal part 200 and the respective sensors Pp, Pm, Ph for detecting fluid pressures, the controller 204 is connected with a wheel velocity sensor 206 for detecting the wheel velocity of the respective wheels, an acceleration sensor 208 for detecting acceleration applied to the vehicle, and an inclination angle sensor (inclination detecting unit) 210 for detecting the inclination angle of the vehicle with respect to the front/rear direction.

The controller 204 is provided with, for example, a CPU, a RAM, a ROM, and an input/output circuit and executes holding control (see FIG. 3 described later) by performing various computation processes, based on inputs of detection signals from various sensors and programs and data stored in the ROM. Incidentally, the present embodiment will be described with later-described HSA (Hill Start Assist) control as an example of holding control, however, the invention is not limited thereto.

Further, the controller 204 includes an HSA (Hill Start Assist) intervention necessity/unnecessity determining unit 212, a reference brake pressure setting unit 214, an HSA required fluid pressure setting unit (holding-control required fluid pressure setting unit) 216, a storage unit 218, a driver required fluid pressure obtaining unit 220, a brake pressure holding control unit 224, and a motor control signal output unit 226.

Incidentally, the brake pressure holding control unit 224 includes a differential value computing unit 228, an offset pressure setting unit 230, an HSA start reference pressure setting unit (holding-control start reference pressure setting unit) 232, and a comparing unit 234.

The HSA intervention necessity/unnecessity determining unit 212 determines whether or not to apply HSA control mode when a vehicle has stopped on an ascent road, based on wheel velocity information from the wheel velocity sensor 206 and acceleration information from the acceleration sensor 208. When the vehicle has stopped on an ascent road and the intervention necessity/unnecessity determining unit 212 has determined that the HSA control mode should be applied, the HSA intervention necessity/unnecessity determining unit 212 outputs a determination signal representing this fact to the differential value computing unit 228 of the brake pressure holding control unit 224.

The reference brake pressure setting unit 214 is used to set, for example, a reference brake pressure for HSA control necessary for maintaining a stop state of the vehicle when the vehicle has stopped on an ascent road. When inclination angle information with respect to the front/rear direction of the vehicle is input from an inclination angle sensor 210, the reference brake pressure setting unit 214 sets a reference brake pressure, referring to a map, not shown, which shows the relationship between inclination angle and reference brake pressure stored in advance in the storage unit 218. A reference brake pressure is, for example, set to a brake pressure that can inhibit the vehicle from going backward on an ascent road. Incidentally, the reference brake pressure having been set is output to the HSA start reference pressure setting unit 232 of the brake pressure holding control unit 224.

The HSA required fluid pressure setting unit 216 is used to set an HSA required fluid pressure serving as a target fluid pressure for following control by the electric motor 72 after starting HSA control. As described later, when the comparing unit 234 has determined that 'the driver required fluid pressure has become lower than the total value of the reference brake pressure and the offset pressure (>0)(=reference brake pressure+offset pressure)', the total value of the reference brake pressure and the offset pressure is set as the HSA required fluid pressure. In other words, when the comparing unit 234 has made a determination as described above, the HSA required fluid pressure setting unit 216 changes an HSA required pressure, which has been set to the same value as the reference brake pressure up to the time of the determination, to the total value of the reference brake pressure and the offset pressure. Incidentally, the HSA required fluid pressure changed to the total value of the reference brake pressure and the offset pressure by the HSA required fluid pressure setting unit 216 is output to the motor control signal output unit 226.

The storage unit 218 stores the above-described map and also stores a map representing the relationship between later-described amount of change per predetermined time in the driver required fluid pressure, and the offset pressure. Incidentally, the respective maps are obtained by experiment, simulation, or the like.

The driver required fluid pressure obtaining unit 220 converts a pedal stroke (pedal operation amount) of the brake pedal 12 output from the stroke sensor 202 into a brake hydraulic pressure (hereinafter referred to as 'a drive required fluid pressure') that is assumed to be required by the driver. As the driver required fluid pressure is proportional to the pedal stroke, the pedal stroke can be converted into the driver required fluid pressure by multiplying the pedal stroke by a predetermined correction coefficient. A driver required fluid pressure obtained by the driver required fluid pressure obtaining unit 220 is output respectively to the differential value computing unit 228 and the comparing unit 234 of the brake pressure holding control unit 224.

In the following, the brake pressure holding control unit 224 will be described.

The differential value computing unit 228 obtains information of the driver required fluid pressure from the driver required fluid pressure obtaining unit 220, and computes the absolute value of the temporal differential value ($=(P_T-P_{T-\Delta t})/\Delta t$) of the driver required fluid pressure, based on a previous value $P_{T-\Delta t}$ (a driver required fluid pressure obtained at time T−Δt) that is the driver required fluid pressure obtained last time and a current value $P_T$ (a driver required fluid pressure obtained at time T) that is the driver required fluid pressure obtained this time. The computed temporal differential value of the driver required fluid pressure is output to the offset pressure setting unit 230. Incidentally, the temporal differential value of the driver required fluid pressure is corresponds to a pedal returning speed obtained by temporal differentiation of a return operation amount of the brake pedal 12.

The offset pressure setting unit 230 computes an offset pressure (>0), based on the differential value of a driver required fluid pressure. Concretely, the offset pressure setting unit 230 sets an offset pressure, based on the relationship, shown in FIG. 4, between the amount of change per predetermined time in the driver required fluid pressure and the offset pressure. Incidentally, the relationship between the amount of change per predetermined time in the driver required fluid pressure and the offset pressure is stored as a map in the storage unit 218.

The larger the amount of change per predetermined time in the driver required fluid pressure is, in other words, the higher the speed of the returning operation of the brake pedal 12 is, the higher the value of the offset pressure is set. The offset pressure having been set by the offset pressure setting unit 230 is output to the HSA start reference pressure setting unit 232.

The HSA start reference pressure setting unit 232 is used to set an HSA start reference pressure serving as a threshold value for starting HSA control, based on a reference brake pressure necessary for maintaining a stop state of the vehicle. As shown in FIG. 6B, this HSA start reference pressure is set to a value equal to the reference brake pressure (thin dashed line E) before time t2 when an offset pressure is added, is set to the total value of the reference brake pressure and the offset pressure during the time from time t2 to time (t2+T1), and is set to the value equal to the reference brake pressure after time (t2+T1). This offset pressure linearly changes with the pedal returning speed (the amount of change in the driver required fluid pressure) of the brake pedal 12 by the driver. In the present embodiment, after the driver quickly steps off the brake pedal 12, the pedal returning speed (the amount of change in the driver required fluid pressure) gradually changed. Accordingly, the offset pressure is set such as to suddenly rise in a step shape at first, then hold a constant state, and become to have a downward-sloping gradient with which the offset pressure gradually decreases. In contrast, when the driver gradually steps off the brake pedal 12, an offset pressure is not generated as overshoot does not occur (see time t5 to time t6 in FIG. 5). Incidentally, in FIG. 6B, the total value of the reference brake pressure and the offset pressure is described as the HSA start reference pressure during the time from t2 to time (t2+T1). An HSA start reference pressure having been set by the HSA start reference pressure setting unit 232 is output to the comparing unit 234.

The comparing unit 234 compares the HSA start reference pressure output from the HSA start reference pressure setting unit 232 and the driver required fluid pressure obtained by the driver required fluid pressure obtaining unit 220. When the driver required fluid pressure has become lower than the HSA start reference pressure (total of reference brake pressure+ offset pressure), the comparing unit 234 outputs a setting signal to the HSA required fluid pressure setting unit 216 to set the total value of the reference brake pressure+the offset pressure as an HSA required fluid pressure.

Figure 6A:
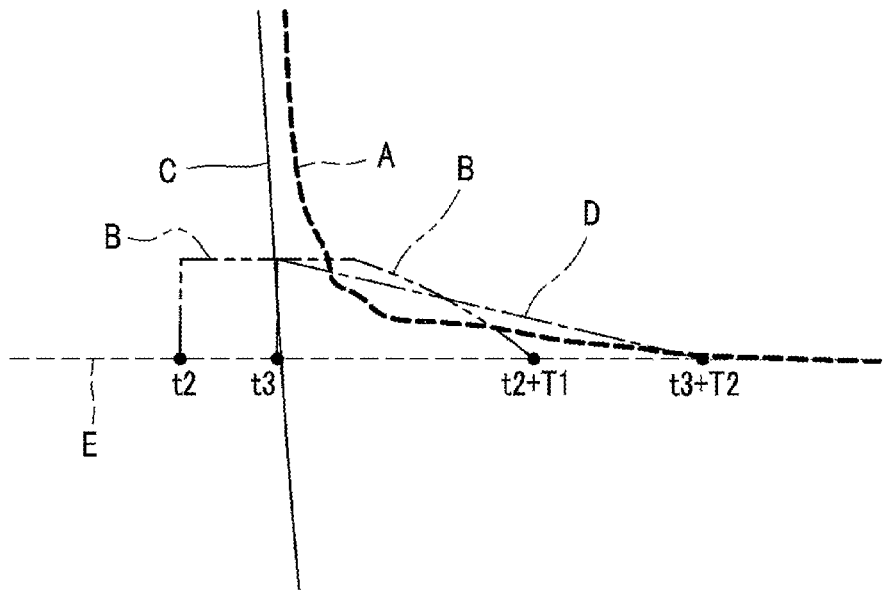
FIG. 6A is a time chart showing an enlarged view of the main part of FIG. 5.
Figure 6B:
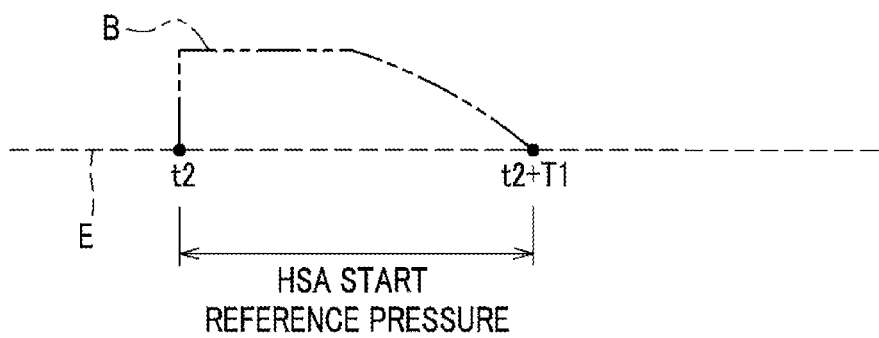
FIG. 6B is a time chart showing an enlarged view of only the HSA starting reference pressure.
Figure 6C:
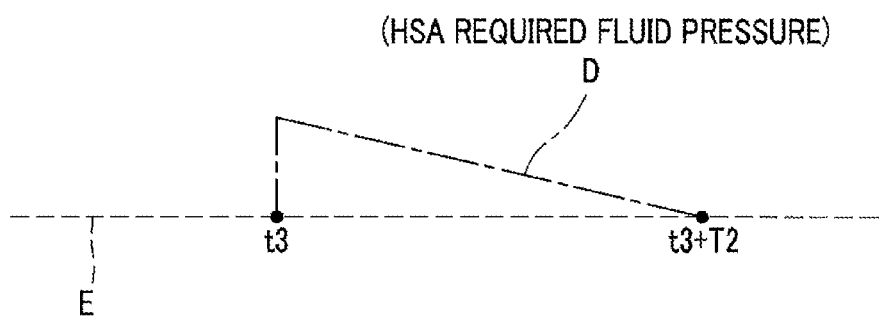
FIG. 6C is a time chart showing only the HSA required fluid pressure.

As shown in FIG. 6C, the HSA required fluid pressure is set to a value equal to the HSA start reference pressure (total value of reference brake pressure+offset pressure) at time t3 (the time when the driver required fluid pressure has become lower than the total value (=reference brake pressure+offset pressure) of the reference brake pressure and the offset pressure (>0)). From time t3 to time (t3+T2), the HSA required fluid pressure is set such as to gradually decrease toward the reference brake pressure. After time (t3+T2), the HSA required fluid pressure is set to a value equal to the reference brake pressure.

Further, on the other hand, when the driver required fluid pressure has become lower than the HSA start reference pressure (total value of reference brake pressure+offset pressure), the comparing unit 234 outputs a signal to the HSA required pressure setting unit 216.

The motor control signal output unit 226 outputs a motor control signal to a motor driving circuit 236 to control the rotation of the electric motor 72 of the motor cylinder device 16. Upon reception of a signal from the HSA required fluid pressure setting unit 216, the motor control signal output unit 226 outputs a control signal (for example, a control pulse signal) to the motor driving circuit 236 such as to follow the HSA required pressure. The rotational driving of the electric motor 72 is controlled via the motor driving circuit 236.

The controller 204 is provided with a target fluid pressure adjusting unit, not shown. This target fluid pressure adjusting unit selects the highest target fluid pressure value of respective required fluid pressures in relation with controls other than HSA control, which are performed in the present embodiment. A fluid pressure control signal corresponding to this selected target fluid pressure value is output from the motor control signal output unit 226 to the motor driving circuit 236.

The brake hydraulic pressure control system for vehicle 10 in the present embodiment is configured basically as described above, and the operation and advantages thereof will be described below.

During normal operation when the brake hydraulic pressure control system for vehicle 10 normally functions, the first shut-off valve 60b and the second shut-off valve 60a, which are normal open type solenoid valves, are in a valve close state by being magnetically excited with a current, and the third shut-off valve 62, which is a normal closed type solenoid valve, is in a valve open state by being magnetically excited with a current. Accordingly, as the first fluid pressure system 70b and the second fluid pressure system 70a are shut off by the first shut-off valve 60b and the second shut-off valve 60a, it does not occur that a brake hydraulic pressure (the first brake hydraulic pressure) generated by the master cylinder 34 of the input device 14 is transmitted to the wheel cylinders 32FR, 32RL, 32RR, and 32FL of the disk brake mechanisms 30a-30d.

At this moment, a brake hydraulic pressure generated by the first pressure chamber 56b of the master cylinder 34 is transmitted through the branched hydraulic passage 58c and the third shut-off valve 62 in the valve open state to the hydraulic pressure chamber 65 of the stroke simulator 64. The brake hydraulic pressure supplied to the fluid pressure chamber 65 displaces the simulator piston 68 against the spring forces of the first and second return springs 66a and 66b, and a stroke of the brake pedal 12 is thereby allowed and a pseudo petal reaction force is generated to be applied to the brake pedal 12. As a result, a brake feeling without a strange feeling for a driver can be obtained.

In such a system state, when a pedal stroke is output from the stroke sensor 202, the controller 204 drives the electric motor 72 of the motor cylinder device 16 to urge the actuator mechanism 74, and displaces (forward) the first slave piston 88b and the second slave piston 88a toward the arrow direction X1 in FIG. 1 against the spring forces of the first return spring 96b and the second return spring 96a. By the displacements of the first slave piston 88b and the second slave piston 88a, the brake hydraulic pressure in the first brake hydraulic pressure chamber 98b and the brake hydraulic pressure in the second brake hydraulic pressure chamber 98a are subjected to a pressure increase such as to balance with each other, and a brake hydraulic pressure corresponding to the driver required fluid pressure is thus generated.

These brake hydraulic pressures of the first fluid pressure chamber 98b and the second fluid pressure chamber 98a in the motor cylinder device 16 are transmitted through the first invalve 120 and the second invalve 124 of the VSA device 18 which are in the valve open state, to the wheel cylinders 32FR, 32RL, 32RR, and 32FL of the disk brake mechanisms 30a-30d. By operation of the wheel cylinders 32FR, 32RL, 32RR, and 32FL, desired braking forces are applied to the respective wheels.

In other words, in the brake hydraulic pressure control system for vehicle 10, during a normal state that the motor cylinder device 16, which functions as a fluid pressure source for power, an ECU, and the like, not shown, are operable, a so-called brake by-wire type brake system becomes active, wherein in a state that communications between the master cylinder 34, which generates a brake hydraulic pressure generated by an operator's pedaling of the brake pedal 12, and the disk brake mechanisms 30a-30d (wheel cylinders 32FR, 32RL, 32RR, an 32FL) that brake the respective wheels are shut off by the first shut-off valve 60b and the second shut-off valve 60a, and wherein the disk brake mechanisms 30a-30d are operated by the brake hydraulic pressure (the second brake hydraulic pressure) generated by the motor cylinder device 16.

On the other hand, during an ignition off state that the motor cylinder device 16 or the like does not operate, a so-called conventional hydraulic type brake system becomes active, wherein the first shut-off valve 60b and the second shut-off valve 60a are respectively made in a valve open state, and the third shut-off valve 62 is made in a valve close state so as to transmit a brake hydraulic pressure (the first brake hydraulic pressure) generated by the master cylinder 34 to the disk brake mechanisms 30a-30d (wheel cylinders 32FR, 32RL, 32RR, 32FL) and thereby operate the disk brake mechanisms 30a-30d (wheel cylinders 32FR, 32RL, 32RR, and 32FL).

Figure 3:
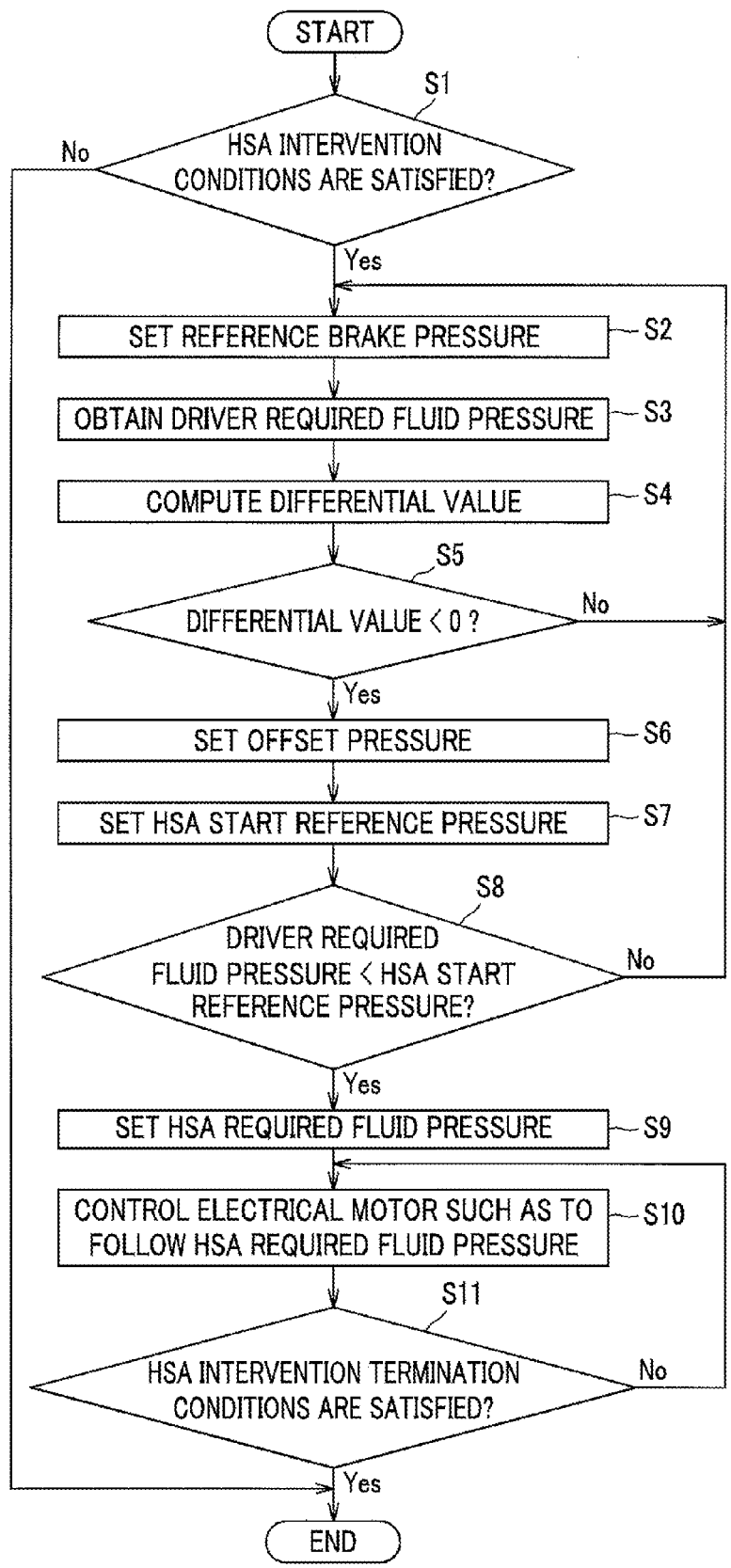
FIG. 3 is a flowchart showing the operation of the controller.
Figure 4:
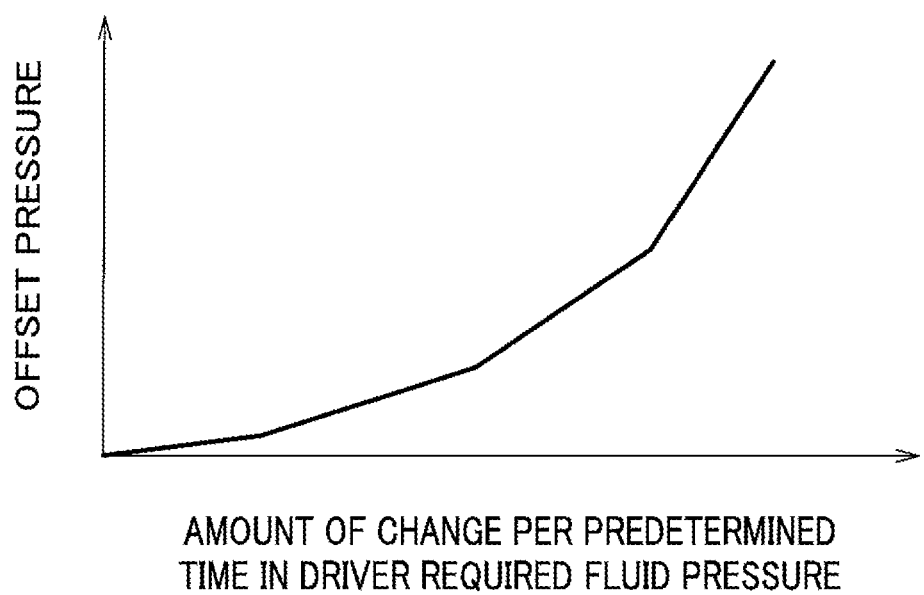
FIG. 4 is a characteristic diagram showing the relationship between amount of change per predetermined time in driver required fluid pressure and offset pressure.

FIG. 3 is a flowchart showing the operation of the controller 204. FIG. 4 is a characteristic diagram showing the relationship between the amount of change per predetermined time in the driver required fluid pressure and the offset pressure.

Based on detection signals from wheel velocity sensor 206, the acceleration sensor 208 and the inclination angle sensor 210, the controller 204 determines whether or not HSA intervention conditions are satisfied, for example, when the vehicle has stopped on an ascent road (step S1). For the determination on whether or not the HSA intervention conditions are satisfied, determination objects include, in addition to the fact that the vehicle is in a stop state (The output from the wheel velocity sensor 206 is zero.), for example, the output from the inclination angle sensor 210 is in a positive gradient; the shift position of the shift lever is in the drive range; the brake pedal 12 is pedaled; the accelerator pedal is not pedaled; and the like.

In step S1, if it is determined that the HSA intervene conditions are satisfied (step S1, Yes), the process proceeds to step S2. On the other hand, if it is determined that the HSA intervene conditions are not satisfied (step S1, No), the process by this flow is once terminated, and the process from step S1 is repeated.

After determining that the HSA intervention conditions are satisfied, the controller 204 sets a reference brake pressure by the reference brake pressure setting unit 214, and obtains a driver required fluid pressure by the driver required fluid pressure obtaining unit 220 (steps S2, S3)

Concretely, information of the inclination angle with respect to the front/rear direction of the vehicle is input from the inclination angle sensor 210 to the reference brake pressure setting unit 214, and a reference brake pressure is set, with reference to a map, not shown, representing the relationship between the inclination angle and the reference brake pressure stored in advance in the storage unit 218. Further, the driver required fluid pressure obtaining unit 220 obtains a driver required fluid pressure by conversion from a pedal stroke (pedal operation amount) of the brake pedal 12 output from the stroke sensor 202.

Subsequently, based on the driver required fluid pressure obtained in step S3, the temporal differential value of the driver required fluid pressure is computed (step S4). As described above, the differential value computing unit 228 computes the absolute value of the temporal differential value $(=(P_T-P_{T-\Delta t})/\Delta t)$ of the driver required fluid pressure, based on a previous value $P_{T-\Delta t}$ (a driver required fluid pressure obtained at time T−Δt) that is the driver required fluid pressure obtained last time and a current value $P_T$ (a driver required fluid pressure obtained at time T) that is the driver required fluid pressure obtained this time.

Subsequently, it is determined whether or not the computed temporal differential value of the driver required fluid pressure is a negative value (the differential value <0) (step S5). If the differential value is negative, 'Yes' is determined in step S5, and the process proceeds to step S6. Incidentally, if the differential value is positive (the differential value >0) (step S5, No), as the brake pedal 12 remains being pedaled by the driver, the process returns to step S2, and the routine from step S2 to step S5 is repeated until the differential value becomes negative.

Further, an offset pressure is set, based on the absolute value of the temporal differential value of the driver required fluid pressure, the temporal differential value having been obtained in step S4 (step S6). As described above, the offset pressure is set, based on the relationship between the amount of change per predetermined time in the driver required fluid pressure and the offset pressure (see FIG. 4). The higher the return speed (operation speed) of the brake pedal 12 is, the higher the value of the offset pressure is set.

In the following, an HSA start reference pressure is set by the HSA start reference pressure setting unit 232 (step S7). As described above, the HSA start reference pressure is set to a value equal to the reference brake pressure (thin dashed line E) before time t2 when the offset pressure is added. In the period from time t2 to time (t2+T1), the HSA start reference pressure is set to a value equal to the total value of the reference brake pressure and the offset pressure corresponding to the pedal return speed by the driver (the amount of change in the driver required fluid pressure). After time (t2+T1), the HSA start reference pressure is set to a value equal to the reference brake pressure.

Subsequently, the comparing unit 234 determines whether or not the driver required fluid pressure obtained in step S3 has become below the HSA start reference pressure set in step S7 (step S8). If the driver required fluid pressure has become below the HSA start reference pressure (step S8, Yes), the required HSA fluid pressure setting unit 216 sets an HSA required fluid pressure (step S9), and the electric motor 72 is controlled such as to follow the HSA required fluid pressure, with the set HSA required fluid pressure as a target fluid pressure (step S10).

Finally, it is determined whether or not the HSA intervention termination conditions are satisfied, and if it is recognized, for example, by a detection signal from the wheel velocity sensor 206, that the acceleration pedal, not shown, has been pedaled and the vehicle has started (step S11, Yes), it is determined that the HSA intervention termination conditions are satisfied, and the HSA control is thereby terminated. On the other hand, if it is determined that the HSA intervention termination conditions are not satisfied, the process returns to step S10, and following control of by the electric motor 72 is continued.

Incidentally, in step S8, if the driver required fluid pressure is not below the HSA start reference pressure (step S8, No), the process returns to step S2, and the process from step S2 is repeated.

Figure 5:
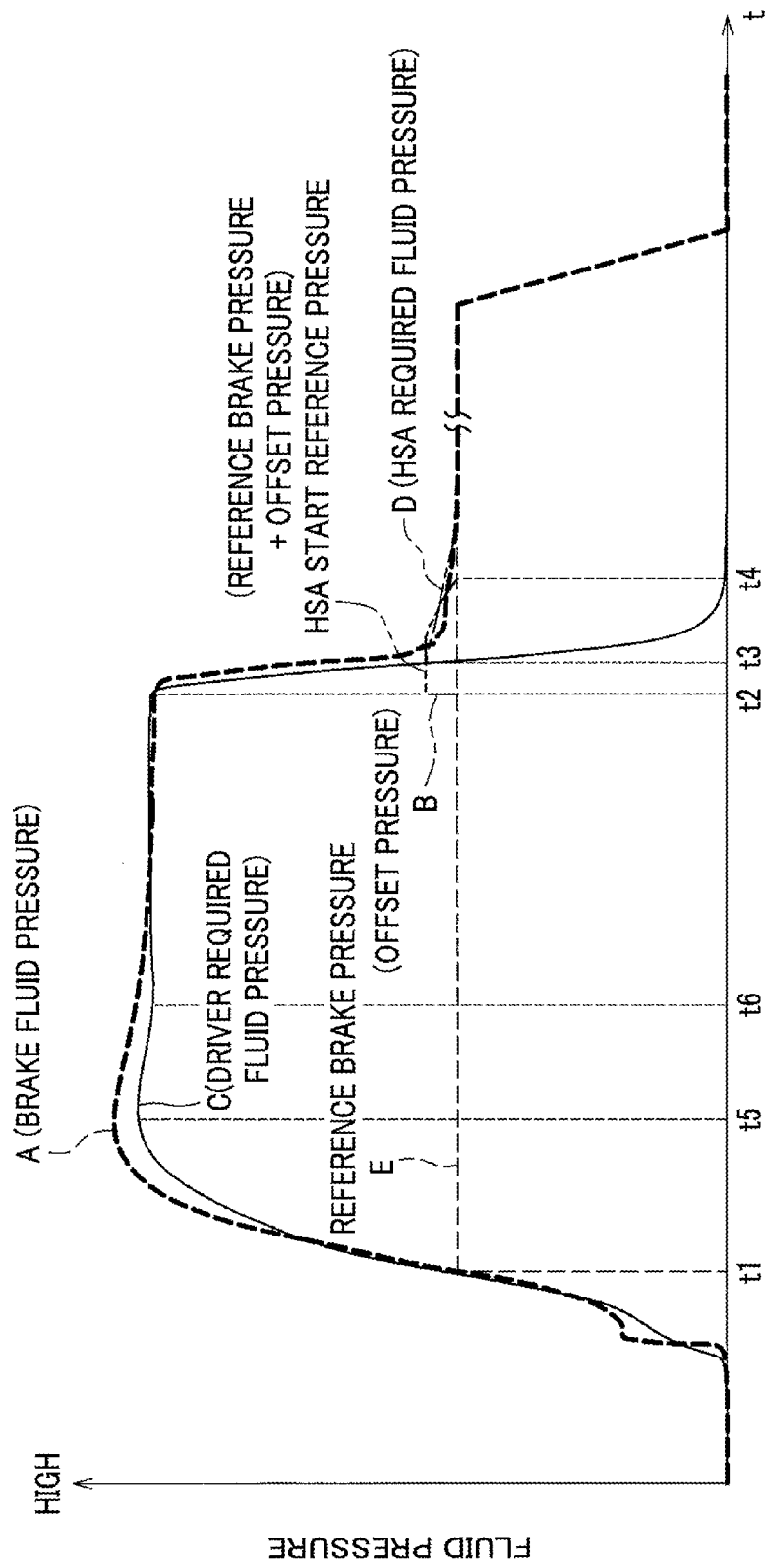
FIG. 5 is a time chart showing the relationship between brake hydraulic pressure detected by a pressure sensor Pp, driver required fluid pressure, reference brake pressure, and HSA required fluid pressure.
Figure 7:
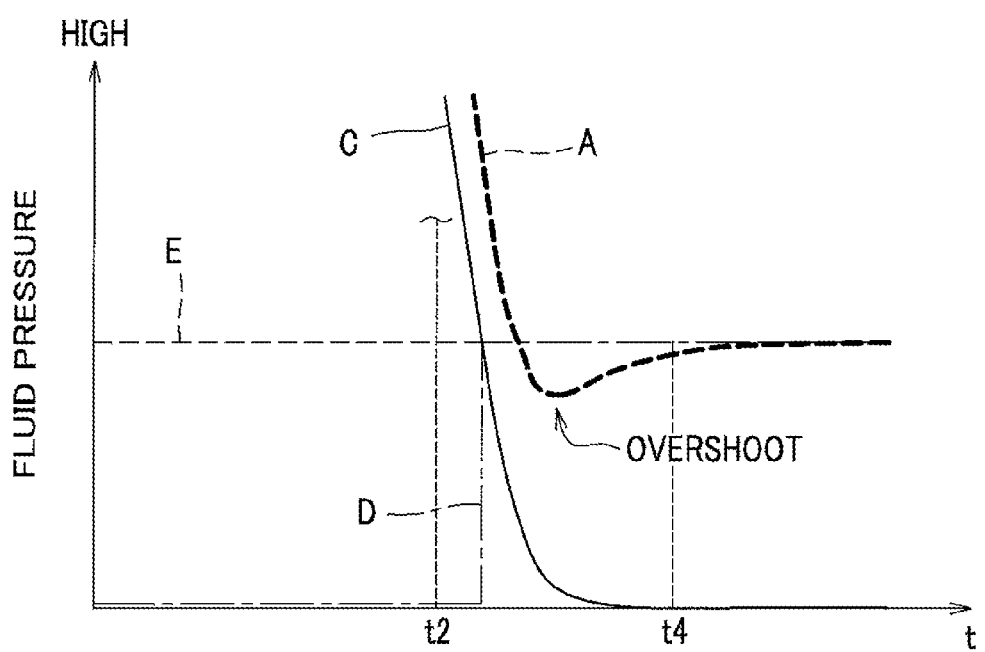
FIG. 7 is a time chart showing a comparative example in which an offset pressure is not added to a reference brake pressure.

FIG. 5 is a time chart showing the relationship between the brake hydraulic pressure detected by the pressure sensor Pp (see FIG. 1), the driver required fluid pressure, the reference brake pressure, and the HSA required fluid pressure. FIG. 6A is a time chart showing an enlarged view of the main part of FIG. 5, FIG. 6B is a time chart showing an enlarged view of only the HSA start reference pressure, and FIG. 6C is a time chart showing an enlarged view of only the HSA required fluid pressure. FIG. 7 is a time chart showing a comparative example in which an offset pressure is not added to the reference brake pressure.

Incidentally, in FIGS. 5 to 7, the curve A (thick dashed curve) represents the brake hydraulic pressure detected by the pressure sensor Pp, the curve B (two-dot chain curve) represents the HSA start reference pressure, the curve C (thin solid curve) represents the driver required fluid pressure, the curve D (alternate long and short dash curve) represents the HSA required fluid pressure, and the thin dashed line E represents the reference brake pressure.

As shown in FIG. 5, when the driver pedals the brake pedal 12 on an ascent road and has thereby stopped the vehicle, the controller 204 sets a reference brake pressure (thin dashed line E) in the process in step S2 (see time t1).

After the vehicle has stopped on the ascent road, if the driver suddenly steps off the brake pedal 12 at time t2, the controller 204 sets an HSA start reference pressure (reference brake pressure+offset pressure) by adding a certain offset pressure (curve B) to the reference brake pressure in the process in step S7. This HSA start reference pressure is set as a brake hydraulic pressure that rises in a stepped form from the reference brake pressure, then holds a constant pressure, and gradually drops down to the reference brake pressure having been set already (see FIG. 6B).

Further, at time t3, when the driver required fluid pressure (curve C) has become lower than the HSA start reference pressure (curve B) obtained by adding the offset pressure to the reference brake pressure, the HSA required fluid pressure (curve D) rises up to a value equal to the HSA start reference pressure, and HSA control starts. Incidentally, if the driver required fluid pressure (curve C) does not become below the HSA start reference pressure (curve B), HSA required fluid pressure (curve D) is not set, and hill start assist control (HSA control) does not start.

The HSA required fluid pressure (curve D) having been set to a value higher than the reference brake pressure gradually decreases with time to become a value equal to the reference brake pressure (thin dashed line E) (see FIG. 6A). This is because the driver would have a strange brake release feeling if a fluid pressure higher than the reference brake pressure were held, being unchanged from the HSA start reference pressure. Incidentally, the HSA required fluid pressure (curve D) is set such that the higher the offset pressure having been set, the longer the time from when the offset pressure is added (time t2 in FIG. 5) until when the HSA required fluid pressure (curve D) becomes the reference brake pressure.

Thus, although the brake hydraulic pressure (the fluid pressure controlled by the motor cylinder device 16; curve A) detected by the pressure sensor Pp becomes lower than the HSA required fluid pressure from time t3 to time t4, the brake hydraulic pressure does not become lower than the reference brake pressure (thin dashed line E), and thereafter comes to be held at the reference brake pressure.

On the other hand, in a comparative example, for example, in which an offset pressure is not added to a reference brake pressure, as shown in FIG. 7, when an HSA required fluid pressure (curve D) rises in a state that the driver required fluid pressure (curve C) becomes lower than the reference brake pressure (thin dashed line E), it is possible that the brake pressure (curve A) controlled by a motor cylinder device 16 becomes lower than the reference brake pressure (curve E), in other words, overshoot occurs.

In the present embodiment, for example, after the vehicle has stopped on an ascent road, when a physical amount (for example, the return speed of the brake pedal 12, the amount of change per predetermined time in the driver required fluid pressure, the rotational speed of the electric motor 72, the master cylinder pressure in the master cylinder 34, etc.), which correlates with the rotational speed of the electric motor 72, has become a predetermined value or larger, the HSA start reference pressure setting unit 232 sets an HSA start reference pressure, and holding control starts at the time (t3) when the driver required fluid pressure has become lower than the HSA start reference pressure. Further, even if the driver suddenly steps off the brake pedal 12 and the driver required fluid pressure required by the driver suddenly drops to become lower than the HSA start reference pressure, holding control is started with a fluid pressure higher than the reference brake pressure, and it is thereby possible to appropriately prevent the holding control pressure from becoming lower than the reference brake pressure.

An offset pressure setting unit for setting an offset pressure to be added to a reference brake pressure is provided, and the offset pressure setting unit sets an offset pressure, corresponding to a physical amount correlating with the rotational speed of an electric motor. In such a manner, an offset pressure can be set, corresponding to the physical amount correlating with the rotational speed of the electric motor, and it is thereby possible to appropriately set an HSA start reference pressure, corresponding to the degree of requirement by a driver, wherein the HSA start reference pressure is a fluid pressure higher than the reference brake pressure.

Further, in the present embodiment, the physical amount correlating with the rotational speed of the electric motor 72 is obtained, based on, for example, the returning speed of the brake pedal 12 obtained by temporal differentiation of the returning amount of the brake pedal 12 detected by the brake pedal stroke sensor 202 or the amount of change per predetermined time in the driver required fluid pressure. As a result, in the present embodiment, as the rotational speed of the electric motor 72 is controlled by the returning speed of the brake pedal 12, it is possible to perform HSA control corresponding to the rotational speed of the electric motor 72, without directly detecting the rotational speed of the electric motor 72.

Still further, in the present embodiment, the higher the returning speed of the brake pedal 12 (the amount of change per predetermined time in the driver required fluid pressure (see FIG. 4)) is, the higher value the offset pressure, which is set by the offset pressure setting unit 230, is set to. As a result, in the present embodiment, the offset pressure can be appropriately set, corresponding to the rotational speed of the electric motor 72.

Yet further, in the present embodiment, the HSA required fluid pressure, at the time when the driver required fluid pressure has become lower than the HSA start reference pressure, is set to a value equal to the HSA start fluid pressure at the above-described time. As a result, in the present embodiment, by setting the HSA required fluid pressure and the HSA start reference pressure equal to each other, appropriate control can be obtained so that the brake hydraulic pressure controlled by the electric motor 72 does not become lower than the reference brake pressure and thus overshoot does not occur.

Further, in the present embodiment, the larger the offset pressure being set by the offset pressure setting unit 230, the longer the time from when the offset pressure is added (time t2 in FIG. 5) until when the HSA required fluid pressure becomes the reference brake pressure. As a result, in the present embodiment, the brake hydraulic pressure controlled by the electric motor 72 can be controlled down to the reference brake pressure securely without overshooting.

Still further, in the present embodiment, the inclination angle sensor 210 (see FIG. 1) for detecting the inclination, with respect to the front/rear direction, of the vehicle is provided, and a reference brake pressure is set, based on the inclination information detected by this inclination angle sensor 210. As a result, in the present embodiment, the inclination angle sensor 210 can be satisfactorily used for HSA control that changes the reference brake pressure, based on the inclination angle sensor 210.

Incidentally, in the present embodiment, the operation amount of the brake pedal 12 is detected by the use of the stroke sensor 202 as an operation amount detecting unit, however, the pedal stroke may be detected, for example, using a potentiometer, not shown.

In addition, the controller 204 according to the present embodiment may be used, not only for HSA control, but also for holding control by which a brake hydraulic pressure is held also on a flat road and a descent road in order to assist the brake operating force on the driver side.

What is claimed is:

1. A brake hydraulic pressure control system for vehicle comprising:
   a brake operation element;
   an operation amount detecting unit for detecting an operation amount of the brake operation element;
   an electric motor that is driven, based on the operation amount detected by the operation amount detecting unit;
   a piston that operates forward and backward, accompanying rotation of the electric motor; wherein the displacement amount of the piston is controlled by the electric motor in order to perform holding control, based on a reference brake pressure that is necessary for maintaining a stop state of the vehicle,
   a wheel cylinder for braking wheels by a brake hydraulic pressure corresponding to a displacement amount of the forward and backward operation of the piston;
   an offset pressure setting unit for setting an offset pressure;
   a holding-control start reference pressure setting unit for setting a holding control start reference pressure, based on a reference brake pressure; and
   a holding-control required fluid pressure setting unit for setting a holding control required fluid pressure serving as a target fluid pressure after starting the holding control;
   wherein if a physical amount correlating with a rotational speed of the electric motor has become greater than or equal to a predetermined value, the holding control start reference pressure serving as a threshold value for starting the holding control is set higher than the reference brake pressure, and
   wherein the offset pressure setting unit sets the offset pressure, corresponding to the physical amount correlating with the rotational speed of the electric motor, and
   wherein the holding control start reference pressure is set to a magnitude obtained by adding the offset pressure to the reference brake pressure, and
   wherein if the holding control start reference pressure is higher than the reference brake pressure when the driver required fluid pressure has become lower than the holding control start reference pressure, the holding-control required fluid pressure setting unit sets the holding control required fluid pressure to a value higher than the reference brake pressure.

2. The brake hydraulic pressure control system for vehicle according to claim 1, wherein the larger the amount of change per the predetermined time in the driver required fluid pressure is, the higher value the offset pressure is set to.

3. The brake hydraulic pressure control system for vehicle according to claim 1, wherein the holding-control required fluid pressure setting unit sets the driver required fluid pressure at the time when the driver required fluid pressure has become lower than the holding control start reference pressure, such that the driver required fluid pressure has a gradient gradually decreasing down to a value that is equal to the holding control start reference pressure at the time.

4. The brake hydraulic pressure control system for vehicle according to claim 3, wherein the holding-control required fluid pressure setting unit is arranged such that the higher the offset pressure, the longer a time until the value of the holding control required fluid pressure having been set higher than the reference brake pressure returns to a value equal to the reference brake pressure.

5. The brake hydraulic pressure control system for vehicle according to claim 1, further comprising: an inclination detecting unit for detecting an inclination of the vehicle with respect to a front/rear direction, wherein the reference brake pressure is set, based on an inclination amount detected by the inclination detecting unit.

* * * * *